(12) United States Patent
Sessions et al.

(10) Patent No.: US 8,801,825 B2
(45) Date of Patent: Aug. 12, 2014

(54) SYSTEMS AND METHODS FOR AIR INTAKE FILTER ASSEMBLIES

(75) Inventors: Robert Jacob Sessions, Palm Beach Gardens, FL (US); Martin P. Domenech, North Palm Beach, FL (US); James A. Keener, Wellington, FL (US); William A. Spanks, Jr., Palm Beach Gardens, FL (US)

(73) Assignee: Florida Power & Light Company, Juno Beach, FL (US)

( * ) Notice: Subject to any disclaimer, the term of this patent is extended or adjusted under 35 U.S.C. 154(b) by 445 days.

(21) Appl. No.: 13/299,735

(22) Filed: Nov. 18, 2011

(65) Prior Publication Data

US 2012/0124950 A1    May 24, 2012

Related U.S. Application Data

(60) Provisional application No. 61/416,159, filed on Nov. 22, 2010.

(51) Int. Cl.
- *B01D 46/00* (2006.01)
- *B01D 46/24* (2006.01)
- *F02C 7/052* (2006.01)

(52) U.S. Cl.
CPC ........ *B01D 46/0024* (2013.01); *B01D 46/0005* (2013.01); *B01D 46/0021* (2013.01); *B01D 46/2403* (2013.01); *B01D 2265/029* (2013.01); *B01D 2271/022* (2013.01); *B01D 2271/027* (2013.01); *B01D 2279/60* (2013.01); *F02C 7/052* (2013.01)
USPC .................. 55/482; 55/484; 55/486; 55/498; 55/502; 95/286; 95/287

(58) Field of Classification Search
CPC ........... B01D 46/0002; B01D 46/0005; B01D 46/001; B01D 46/0021; B01D 46/0023; B01D 46/0024; B01D 46/02; B01D 46/24; B01D 46/2403; B01D 46/2411; B01D 2265/02; B01D 2265/029; B01D 2271/022; B01D 2271/027; B01D 2279/60; F02C 7/05; F02C 7/052; F02C 7/055
USPC .................. 55/482, 484, 486, 487, 498, 502; 95/286, 287
See application file for complete search history.

(56) References Cited

U.S. PATENT DOCUMENTS

| | | | | |
|---|---|---|---|---|
| 4,278,455 | A | * | 7/1981 | Nardi .............................. 55/337 |
| 4,304,580 | A | | 12/1981 | Gehl et al. |
| 4,314,832 | A | * | 2/1982 | Fox ................................ 55/482 |
| 4,345,923 | A | * | 8/1982 | Schoen .......................... 96/139 |
| 4,469,595 | A | | 9/1984 | Napadow |
| 4,500,332 | A | * | 2/1985 | Gillingham .................... 55/443 |
| 4,647,373 | A | | 3/1987 | Tokar et al. |

(Continued)

FOREIGN PATENT DOCUMENTS

| | | |
|---|---|---|
| CA | 1110181 | 10/1981 |
| GB | 2160118 | 12/1985 |

*Primary Examiner* — Robert Clemente
(74) *Attorney, Agent, or Firm* — Feldman Gale, P.A.; Michael C. Cesarano

(57) ABSTRACT

Combustion turbine air intake filter assemblies, their components, and methods of use are disclosed. In certain embodiments, the assemblies may be useful, inter alia, for extending high efficiency filter life, reducing turbine downtime for filter assembly changeouts, or adjusting filter assemblies to address changing local conditions after the assemblies have been put into service.

22 Claims, 8 Drawing Sheets

(56) References Cited

U.S. PATENT DOCUMENTS

| | | |
|---|---|---|
| 4,731,177 A | 3/1988 | Hemman |
| 4,812,235 A | 3/1989 | Seleman et al. |
| 4,906,381 A | 3/1990 | Barbaro |
| 4,995,974 A * | 2/1991 | Lorey et al. .................. 210/247 |
| 5,320,653 A * | 6/1994 | Morgan et al. .................. 55/337 |
| 5,462,653 A | 10/1995 | Hills |
| 5,702,602 A | 12/1997 | Brown et al. |
| 5,738,785 A | 4/1998 | Brown et al. |
| 5,803,941 A * | 9/1998 | Berkhoel et al. .................. 55/498 |
| 5,954,849 A * | 9/1999 | Berkhoel et al. .................. 55/498 |
| 6,117,338 A | 9/2000 | Hoagland et al. |
| 6,174,438 B1 | 1/2001 | Hodgkins et al. |
| 6,511,599 B2 | 1/2003 | Jaroszczyk et al. |
| 6,585,892 B2 | 7/2003 | Gerhenson |
| 6,645,381 B2 | 11/2003 | McEvoy |
| 6,830,686 B2 | 12/2004 | Engelhard et al. |
| 6,875,256 B2 * | 4/2005 | Gillingham et al. ............ 95/273 |
| 7,014,761 B2 | 3/2006 | Merritt et al. |
| 7,087,166 B1 | 8/2006 | Sudo et al. |
| 7,179,380 B2 | 2/2007 | Merritt et al. |
| 7,338,601 B2 | 3/2008 | Schott et al. |
| 7,381,335 B2 | 6/2008 | Lee |
| 7,635,429 B2 | 12/2009 | Bauder et al. |
| 7,749,383 B2 | 7/2010 | Jiang |
| 8,070,848 B2 * | 12/2011 | Cosgrove ........................ 55/502 |
| 8,540,805 B2 * | 9/2013 | Jarrier .............................. 95/273 |
| 2004/0103626 A1 * | 6/2004 | Warth et al. ..................... 55/467 |
| 2008/0022855 A1 * | 1/2008 | Clements ........................ 95/280 |
| 2008/0229927 A1 * | 9/2008 | Singh et al. ..................... 95/281 |
| 2009/0107337 A1 * | 4/2009 | Vu .................................. 95/279 |
| 2011/0265434 A1 * | 11/2011 | Polizzi et al. ................. 55/385.1 |

* cited by examiner

SYSTEMS AND METHODS FOR AIR INTAKE FILTER ASSEMBLIES

CROSS REFERENCE TO RELATED APPLICATIONS

This application claims the benefit of U.S. Provisional Application No. 61/416,159 filed Nov. 22, 2010, the disclosure of which is hereby incorporated herein by reference in its entirety.

BACKGROUND OF THE INVENTION

Embodiments of the subject matter disclosed herein generally relate to subject matter disclosed herein systems and methods for air intake filter assemblies and more particularly to combustion turbine air intake filter assemblies.

Filter-in-filter designs are commonly employed for use in combustion turbine air intake filtration systems. These filter designs typically incorporate a relatively coarse pre-filter as an initial filtration stage, followed by an intermediate grade filter. The particular pre-filter or intermediate filter may also be chosen to optimize the system against local environmental conditions to which the combustion turbine is exposed, for example, salt air. These two filters are utilized to remove the majority of contaminants that would otherwise adversely impact the much more costly final stage high efficiency filter and reduce its useful life as well as shield the turbine's components from airborne contaminants. A common, and less expensive and complex commercial alternative is to combine the pre-filter and the intermediate grade filter into a single filter, and to use that with the high efficiency filter in a two-filter assembly.

Regardless which arrangement is used, changeout of the entire assembly is costly, especially when failure of the more readily fouled initial stage filter(s) leads to premature failure of the high efficiency filter and/or exposure of the turbine to adverse conditions, such as corrosion from salt breakthrough. Therefore, changeout of the entire assembly may be remedied by more frequent changeouts, also leading to increased direct costs and may require that the turbine be shut down to facilitate changeout and/or minimize adverse environmental impacts on the turbine, thus contributing to indirect costs through lost or less efficient energy production. Moreover, changes in local conditions over time may alter optimal filter selection for efficient turbine operation, again leading to turbine inefficiencies, increased exposure of the turbine to adverse local conditions, or an increased need for changeout and alternate filter purchase.

Another problem related to the difficulty of changing filters without shutting down the generator is the with proper hermetic seating of filters on the exhaust manifold so that they do not allow unfiltered air to pass through the manifold. If proper care is not taken to align the filters and sealing rings when changing the filters, or if faulty or imperfect sealing rings are used, the filters may not be properly seated, and air passageways may develop through which unfiltered air may be drawn through the manifold and into the turbines. As noted, airborne contaminants are a major cause of turbine failure, or may cause costly unscheduled turbine maintenance.

U.S. Pat. No. 4,304,580 to Gehl et al. discloses air cleaners having replaceable filter cartridges, and particularly to such cleaners having both principal and safety filter functions so that the engine or other device being supplied with cleaned air is not directly open to the ambient atmosphere even if a principal filter undergoes catastrophic failure.

U.S. Pat. No. 7,087,166, to Sudo et al. discloses a filter element comprising a combination of an upstream filter and a downstream filter, wherein the upstream filter is replaceable. As a result, the life of the downstream filter is elongated while attaining the required purified level, and in addition, a smaller number of filters are required in order to obtain the same amount of filtrate compared to conventional filters.

U.S. Pat. No. 4,812,235 to Seleman et al. discloses a filter element constructed of stainless steel that includes a pair of filter media concentrically disposed to receive parallel flow of the filtrant. The element is adapted for disassembly to remove the filter media, allowing for the various component parts of the filter element to be easily cleaned and the filter media replaced.

U.S. Pat. No. 5,462,653 to Hills discloses a continuous polymer filtration apparatus employing parallel filter units that are opened and closed to shift flow from one filter to another to provide the operator with access to off-line filter segments for cleaning or replacing while fluid flow continues through the open filter segments.

U.S. Pat. No. 6,830,686 to Engelhard et al. discloses sealing elements at opposed ends of a filter cartridge to permit use of a single or axially stacked filter cartridges within a housing without compromising the seals necessary to prevent mixing of filtered and unfiltered fluids flowing through the housing.

What is needed are filter assemblies that allow an operator to extend the useful lifetimes for high efficiency filter components in air intake filter assemblies without adversely impacting energy production. Assemblies are also needed whereby an operator can replace filter stages in operational filter assemblies based on needs dictated by local conditions. New filter assemblies are also needed to allow changeouts independently of one or more filter stages, especially changeouts that can be made relatively quickly using simple tools to effect the changeout as compared to existing filter technologies. New filter assemblies are also needed that allow such changeouts while the turbine remains in operation, thus minimizing inefficiencies associated with shutdown and start up of the turbine. The subject matter disclosed herein is directed to these and other important ends.

SUMMARY OF THE INVENTION

In accordance with one embodiment, the subject matter disclosed herein is directed, in part, to novel combustion turbine air intake filter assemblies, components of said assemblies, and/or methods of their use. In particular, the subject matter disclosed herein is directed, in part, to combustion turbine air intake filter assemblies comprising a plurality of filters including a high efficiency air intake filter and first and, optionally, second upstream filters. The filters are cylindrical or cone-shaped, are concentrically mounted within one another, and are attached to an air filter manifold with their longitudinal axes being essentially horizontal. The manifold has an air passage located within the circular footprint of the filters, and air flows from the high pressure side of the manifold to which the filters are attached, through the filters and the air passage to a low pressure side which comprises a chamber for air which is ingested into an operating gas turbine located on the low pressure side of the manifold. There are a plurality of filter assemblies and air passages through the manifold.

At the point where the concentrically assembled filters contact the manifold, there are one or more filter alignment rings which form channels extending concentrically around the air passages through the air filter manifold. The sides of the ring form channels configured to create a sealed interface with the filters on the high pressure side of the manifold. The filter alignment ring has a raised wall extending circumferentially around the ring adjacent the air passage and forms a surface for receiving an end of one of the concentrically assembled filters and for preventing the end from substantial lateral movement. The interface between the receiving surface of the alignment ring and the filters forms a sealed abutment.

The filters are concentrically assembled with the high efficiency filter being the innermost and farthest downstream of the filters. It is concentrically disposed about a structural support that extends generally perpendicularly from the manifold and approximately through the center of the air passage in the manifold. The structural supports are attached to the manifold at the edges of the air passages and extend longitudinally through the concentrically assembled filters to terminate at a threaded post that extends through the end plates which secure the filters. An end nut or other suitable securing device can be used to tighten the end plates and filters against the manifold and, when tightened, will create a sealing force between the filters and the manifold. In the three-filter embodiment, the securing structure is releasably and adjustably secured to the second upstream filter such that, when secured, a sealed interface is formed between the end plate of the second upstream filter and the support structure. When released, the second upstream filter may be removed from the assembly during turbine operation. The two-filter embodiment works the same way with the end nut being secured against the upstream filter.

In certain embodiments, the subject matter disclosed herein is directed to methods of changing out at least one upstream filter in a combustion turbine air filter assembly having either two or three filters while the turbine is in operation. The method comprises unsecuring the farthest upstream filter from the support structure and removing that filter from the filter assembly. This may be done while the turbine is in operation and, as the high efficiency filter will remain in place in a sealed connection, this method will not allow unfiltered air to pass through the manifold. A replacement filter may be installed by reversing the steps of this method.

Certain other embodiments of the invention are directed to a methods for installing a combustion turbine air filter assembly by selecting a high efficiency filter, a first or a first and second upstream filter, sealing them into said one or more channels of a filter alignment ring, and securing each filter to the support. Sealing may take place within the filter alignment ring at the bottom of the ring, or by sealing the end of a filter against one of the sides of the alignment ring.

In yet other embodiments, the filter alignment ring may have a number of concentric channels, adjacent channels being separated by sides extending perpendicularly from the face of the manifold. In this embodiment, the downstream end of each filter may be seated within a separate channel of the alignment ring and, in this arrangement, lateral movement of the downstream end of each filter can be reduced or eliminated.

BRIEF DESCRIPTION OF THE DRAWINGS

The drawings, in which like numerals represent similar parts, illustrate generally, by way of example, but not by way of limitation, various embodiments discussed in the present document.

DETAILED DESCRIPTION OF ILLUSTRATIVE EMBODIMENTS

The foregoing summary, as well as the following detailed description of certain embodiments of the subject matter set forth herein, will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents. In the description that follows, like numerals or reference designators will be used to refer to like parts or elements throughout. In this document, the terms "a" or "an" are used, as is common in patent documents, to include one or more than one. In this document, the term "or" is used to refer to a nonexclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1A:
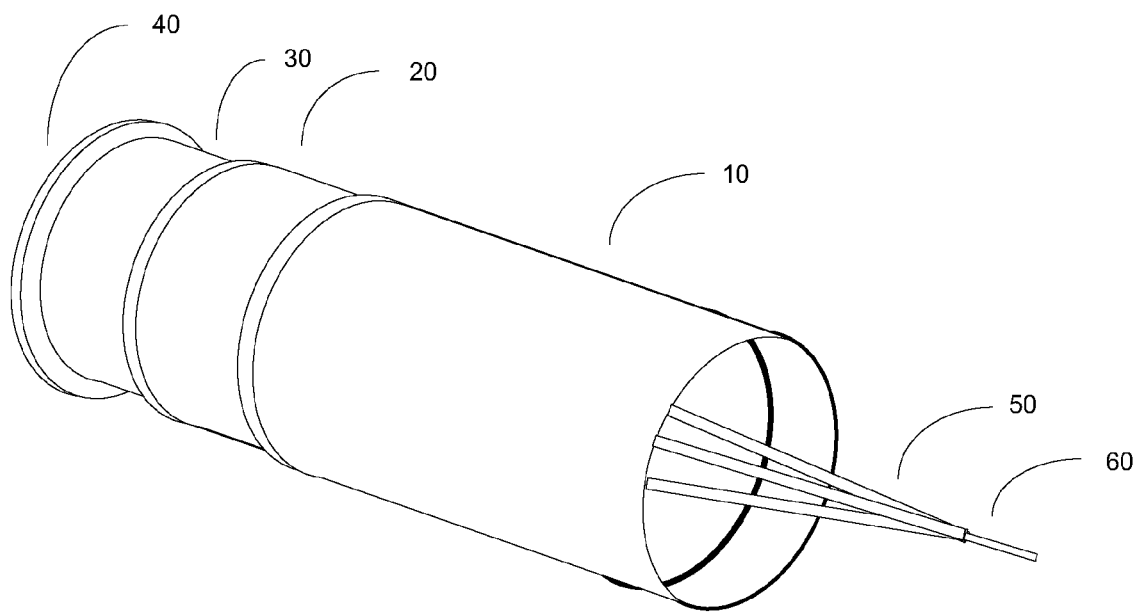
FIG. 1A is an exploded view of an exemplary embodiment of a three filter combustion turbine air intake assembly showing some internal construction of the filter assembly.

FIG. 1A is an exploded view of an exemplary embodiment of a combustion turbine air intake three-filter assembly. In FIG. 1, a second upstream filter 10 is the outermost of three concentrically assembled filters, and receives and filters the largest sized airborne contaminants. A first upstream filter 20 is shown between the second upstream filter 10 and a high efficiency filter 30. A filter alignment ring 40, which will hereafter be discussed in greater detail, is mounted to the manifold and provides a seating element for filters 10, 20 and 30 which may be sealingly tightened against filter alignment ring 40. In the embodiment shown in FIG. 1A, support structure 50 comprises three rigid shafts that converge at the base of threaded post 60. However, support structure 50 may be of any configuration that is attached at one end to the manifold, and that provides means for tightening filters 10, 20 and 30 against filter alignment ring 40 in a hermetically sealed abutment. As shown in FIG. 1A, support structure 50 terminates at a threaded post 60 that is suitable for releasably receiving a nut or other tightening element that may be removed when necessary to replace one or more of filters 10, 20 or 30.

Figure 1B:
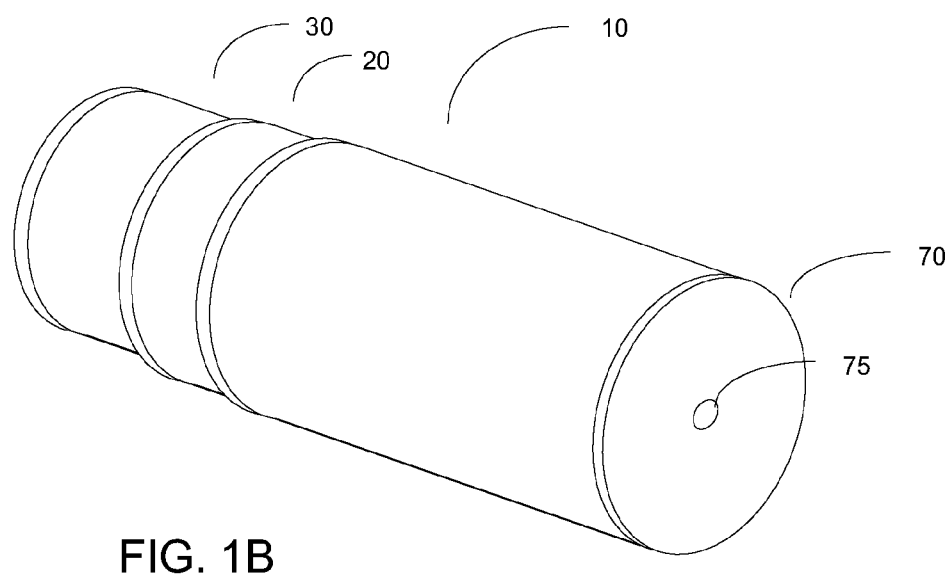
FIG. 1B is an exploded view of the exemplary embodiment of a combustion turbine air intake assembly of FIG. 1A showing the filter assembly with an end cap attached.
Figure 1C:
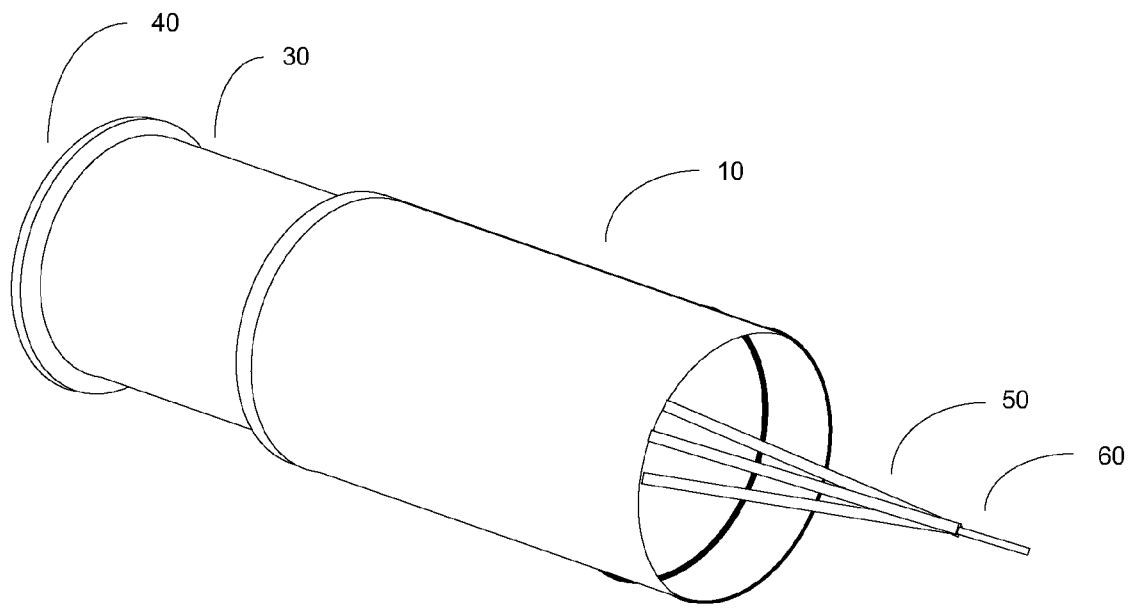
FIGS. 1C and 1D depict a two-filter embodiment of the filter assemblies shown in FIGS. 1A and 1B.
Figure 1D:
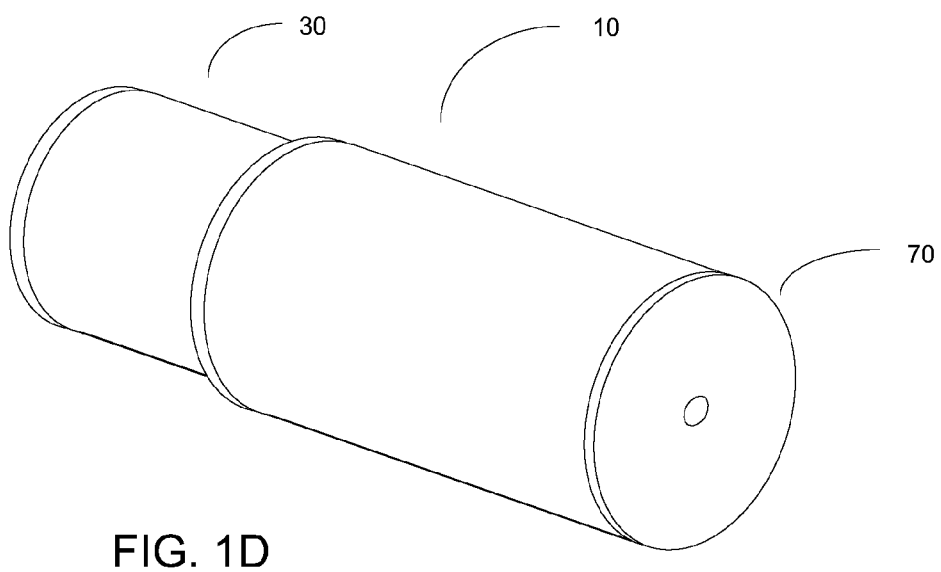

FIG. 1B shows filters 10, 20 and 30 together with an end cap 70. In a preferred embodiment, each of filters 10, 20 and 30 will have an end cap 70 with a central perforation 75 suitable for receiving threaded post 60. In FIG. 1B, end cap 70 for second upstream filter 10 is shown. The perforation 75 through end cap(s) 70 may be fitted with a washer (64 in FIG. 3B) or other suitable element to form a hermetic seal about threaded post 60, thereby ensuring that air cannot flow into the manifold through an air leak associated with end cap(s) 70. FIGS. 1C and 1D show the same elements as FIGS. 1A and 1B in a two-filter embodiment.

Figure 2A:
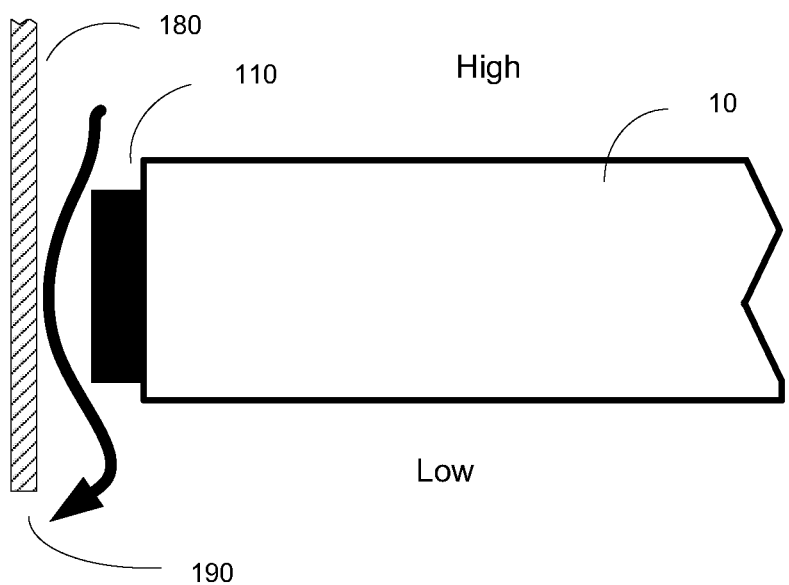
FIGS. 2A and 2B are depictions of common failure modes for filters found in the prior art.

FIG. 2 provides an example of two common failure modes that this invention is intended to remedy. FIG. 2A depicts a second upstream filter 10 situated in proximity to a manifold 180. Although the second upstream filter 10 is depicted in FIG. 2A, it will be understood that any of the filters in a two- or three-concentric filter assembly may suffer the same failure mode as depicted. A sealing medium 110 is situated along the downstream rim of second upstream filter 10 and, when installed, would be expected to form a seal between second upstream filter 10 and manifold 180. Over time, or as a result of improper initial installation, sealing medium 110 may become separated from manifold 180 during operation when air is flowing from the high pressure region through the filter to a lower pressure region. When this happens, air can leak through the passage between the filter medium 110 and the manifold 180, thereby allowing unfiltered air to pass through air passage 190 in manifold 180 and be ingested into the combustion turbine.

Figure 2B:
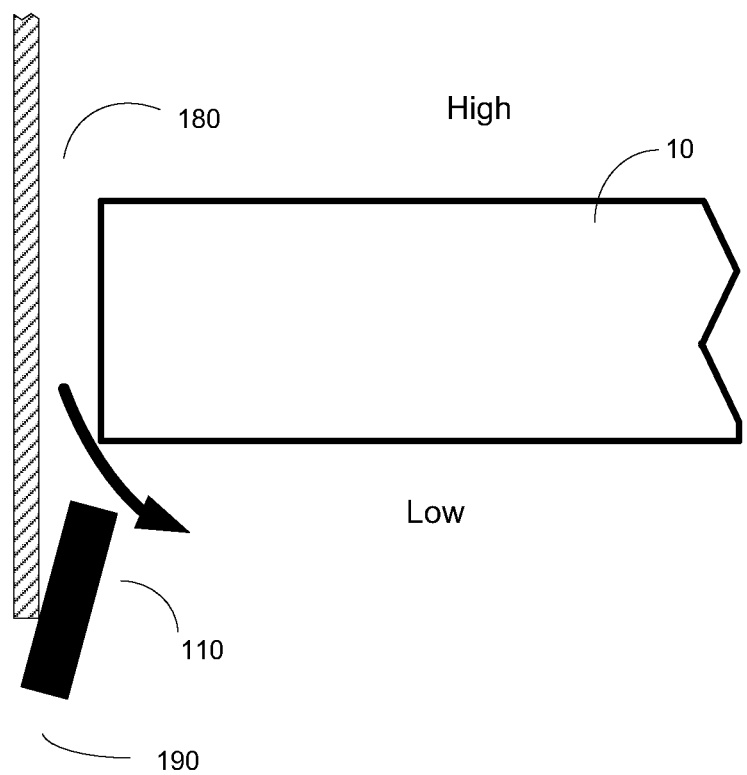

FIG. 2B depicts a second failure mode, in which the sealing medium 110 has become dislodged from both the filter 10 and the manifold 180, possibly being sucked through air passageway 190 and ingested into the turbine where it may cause damage, or at least allowing an air leak to form between the filter 10 and the manifold 180.

Figure 3A:
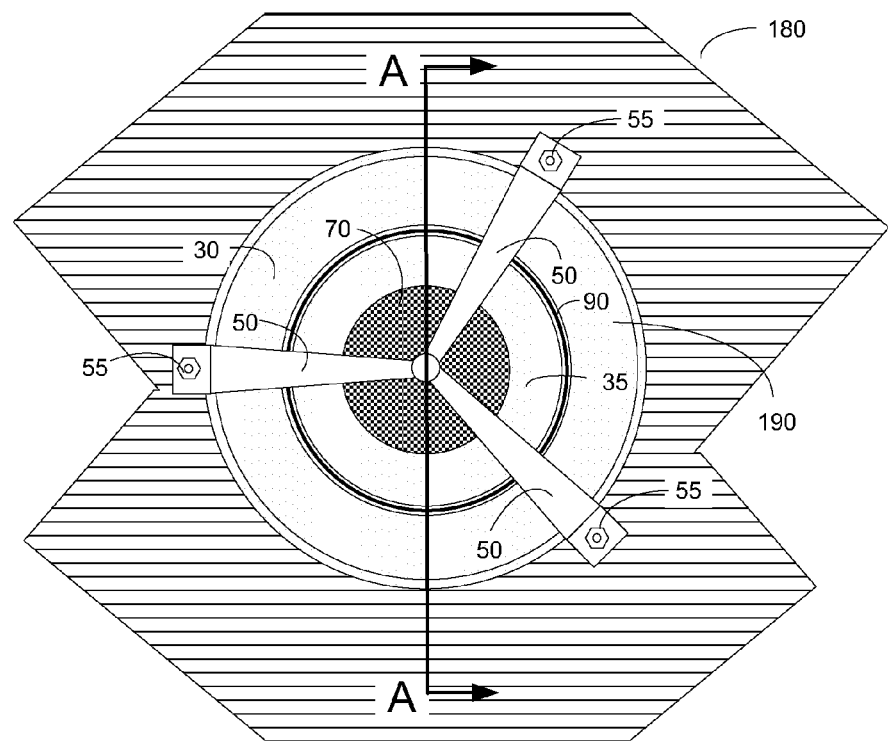
FIG. 3A is a perspective view of a filter assembly taken from the downstream side of the manifold of certain preferred aspects of the subject matter disclosed herein showing a support and attachment to the manifold and a high efficiency filter viewed internally. The figure also illustrates an end on end stacking of two filter units.

FIG. 3A is a view from the low pressure side of manifold 180 through air passage 190 into the interior of a stacked filter assembly. In this embodiment, one or more filters may be stacked end to end, thereby providing a greater amount of surface area for air to be passed through the filters without increasing the number of air passages through the manifold. A stacked filter alignment sealing joint 90 joins those filters that are in direct sealing abutment with the manifold 180 with those that are stacked upon them in an upstream direction. In FIG. 3A, only the innermost, high efficiency filters are visible, with downstream high energy filter 30 being in sealing abutment with manifold 180, and upstream high efficiency filter 35 being in sealing abutment with the upstream end of downstream high energy filter 30. End cap 70 is located at the far end of the upstream high efficiency filter 35, and is supported by supports 50. When tightened against supports 50, end cap 70 provides longitudinal pressure to force the stacked filter assembly against manifold 180, and to force the upstream and downstream filter assemblies into sealing abutment with stacked filter alignment sealing joint 90.

Figure 3B:
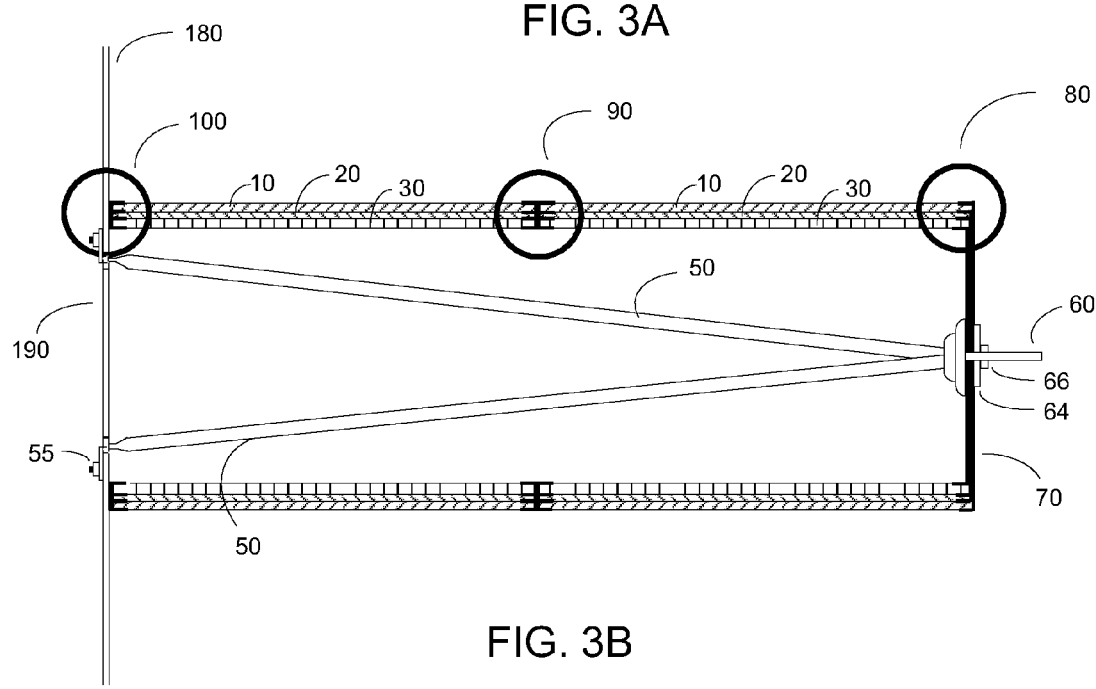
FIG. 3B is a cross sectional view of six filters comprising a two-stacked three-concentric filter design depicted in FIG. 3A.

FIG. 3B shows the stacked filter assembly of FIG. 3A in cross section, taken along line A-A in FIG. 3A. In this embodiment, a stacked three-concentric filter assembly is shown although a two-concentric filter assembly would operate in the same manner as depicted. End cap sealing joints 80 are circled, and depict separate end caps 70 for each of the second upstream filter 10, the first upstream filter 20, and a high efficiency filter 30. End caps 70 are sealed to their respective filters with an adhesive or deformable medium sufficient to provide a hermetic seal when pressure from the supports 50 and threaded post 60 is applied to force end caps 70 against the respective filters. When a filter changeout is necessary, end cap nut 66 and end cap washer 64 will be released, and end caps 70 may be removed to allow access to the specific filter element that is to be changed. In an alternative embodiment, end caps may be permanently attached to filter bodies, eliminating the need for a sealing joint between the end cap and the filter. In this embodiment, whenever a filter is removed from an assembly, its end cap will also be removed as part of the filter. A filter alignment ring 90 is shown at the joint where stacked filter elements come together in abutting proximity. Filter alignment ring 90, shown in cross section in FIG. 5B, may include a sealing medium, such as a gasket, sealant, O-ring, putty, or other suitable device, and will provide a hermetic seal when pressure is applied to force adjacent filter elements together. Filter alignment ring 90 may comprise a metallic or plastic element, and provides rigid support for the filter elements as air passes through the filters from a higher pressure to a lower pressure area. Filter alignment ring 100 provides a hermetically sealed joint between the manifold 180 and the downstream ends of filter elements 10, 20 and 30. A sealing medium may be used to create the seal, and will be effective for that purpose when pressure is applied to force the filter elements against the manifold 180.

Support 50 reinforces the general shape of the high efficiency filter to counter, inter alia, inward forces exerted on the filer assembly from the high pressure side of the filter assembly that results from a pressure differential between the high and low pressure sides of the manifold. Optionally, the support 50 is a tripod, although a bipod or other suitable configurations are known to persons of skill in the art. Support 50 may be attached on the downstream side to the low pressure side of the manifold 180 using any suitable attachment method. As shown in FIG. 3B, supports 50 extend through air passage 190 and are attached to the low pressure side of manifold 180 with a threaded nut 55.

In the embodiment depicted in FIG. 3B, the upstream end of support 50 comprises a threaded post 60. Each of the concentrically assembled filters 10, 20 and 30 may be independently secured to the threaded post by a nut, or optionally, with a washer 64 and a nut 66. Each interface between each of the filters and the support 50 may further comprise a hermetic seal. In yet another exemplary embodiment, the attachment may comprise a conically shaped nut of larger diameter than the aperture(s) of the end caps, or a sleeve extending along the support's longitudinal axis from the upstream end of the support, the sleeve being configured to be secured with a pin or screw. In each instance, the attachment may further comprise a seal between the securing moiety and the filter to assist in hermetically sealing the aperture. Exemplary seals useful with end cap designs include a combination of O-ring and washer, sealing ring and washer, and a gasket. Alternatively, a conically shaped nut with a gasket or washer may be used. Each of these seals may be employed as an independent component, or may be incorporated with, or affixed to, a filter or to the filter alignment ring prior to use.

Figure 4A:
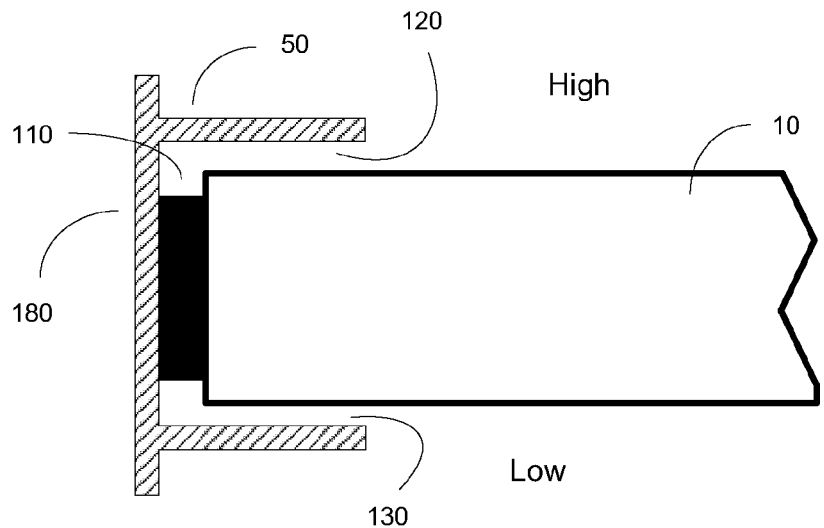
FIG. 4A depicts a first cross sectional view of a part of a single filter sidewall and filter alignment ring with one embodiment of a sealed design.
Figure 4B:
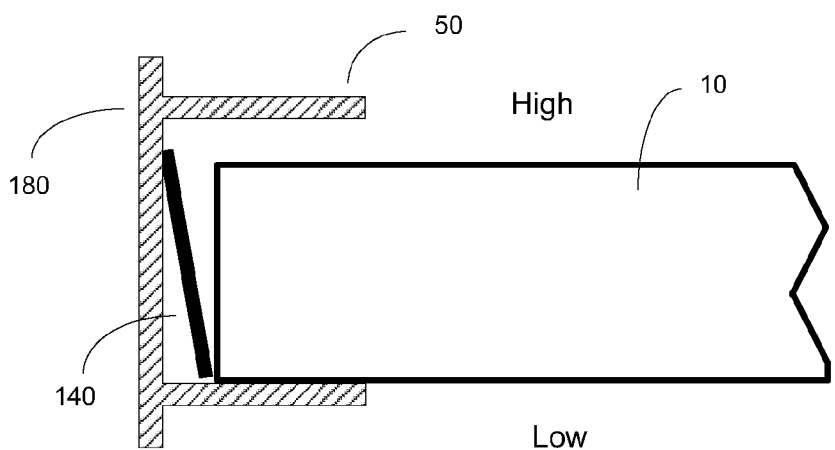
FIG. 4B depicts a second cross sectional view of a part of a single filter sidewall and filter alignment ring with another embodiment of a sealed design.
Figure 4C:
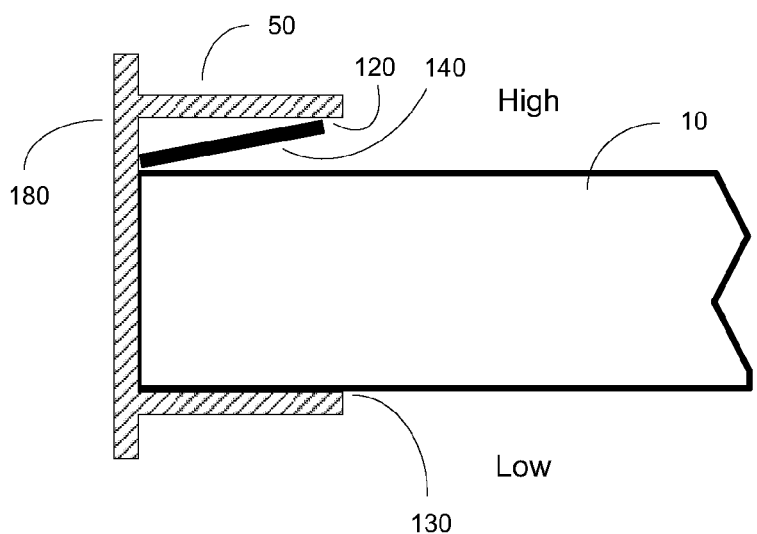
FIG. 4C depicts a third cross sectional view of a part of a single filter sidewall and filter alignment ring with a third embodiment of a sealed design.

FIGS. 4A-4C depict a cross sectional view of a part of the filter sidewall and filter alignment ring 40 with several different seal designs. In FIG. 4A, a gasket or O-ring sealing medium 110 is located within the trough or channel formed by first and second filter alignment ring faces 120 and 130. When pressure is applied forcing filter element 10 against the manifold 180, a hermetic seal is formed that prevents air from leaking around the sealing medium. First and second filter alignment ring faces, 120, 130 provide a physical barrier against lateral movement of either filter element 10 or sealing medium 110, thereby avoiding the failure mode depicted in FIG. 2B.

FIG. 4B depicts an alternative embodiment in which a spring loaded sealing mechanism 140 provides a constant pressure between the sealing surface and the end of the filter element. This embodiment ensures that pressure is maintained on sealing joints 80 and 90 even if end cap nut 60 should loosen slightly over time and continuous use. FIG. 4C depicts another embodiment in which spring loaded sealing mechanism 140 expands against first filter alignment ring face 120 to provide continuous pressure to hold filter element 10 against second filter alignment ring face 130. The seal formed by filter element 10 and second filter alignment ring face 130 may be enhanced with the use of suitable adhesive or deformable sealant. It will be understood that specific references to filter elements in FIGS. 2 and 4 are not limited to a particular filter elements, but are equally applicable to a second upstream filter 10, a first upstream filter 20, and a high efficiency filter 30.

FIGS. 5A-5D depict a two embodiments of a filter alignment ring 40 and 45 attached to a manifold 180, and situated to receive a filter assembly 10, 20 and 30. Filter alignment ring 40 may be welded or otherwise affixed to manifold 180. Optionally, the filter alignment ring 40 may be affixed to the manifold using the same attachments 55 employed to attach the support structure 50 to the manifold 180. At least one function of filter alignment ring 40 is to inhibit, or prohibit seal failure of the seal located between air filter elements 10, 20 and 30 and the alignment ring 40, where the seal failure may be due to differential pressure on the upstream and downstream sides of the seal or due to gravitational stresses exerted on the installed filter elements, either of which may lead to air bypassing the filter assembly.

Figures 5A, 5B:
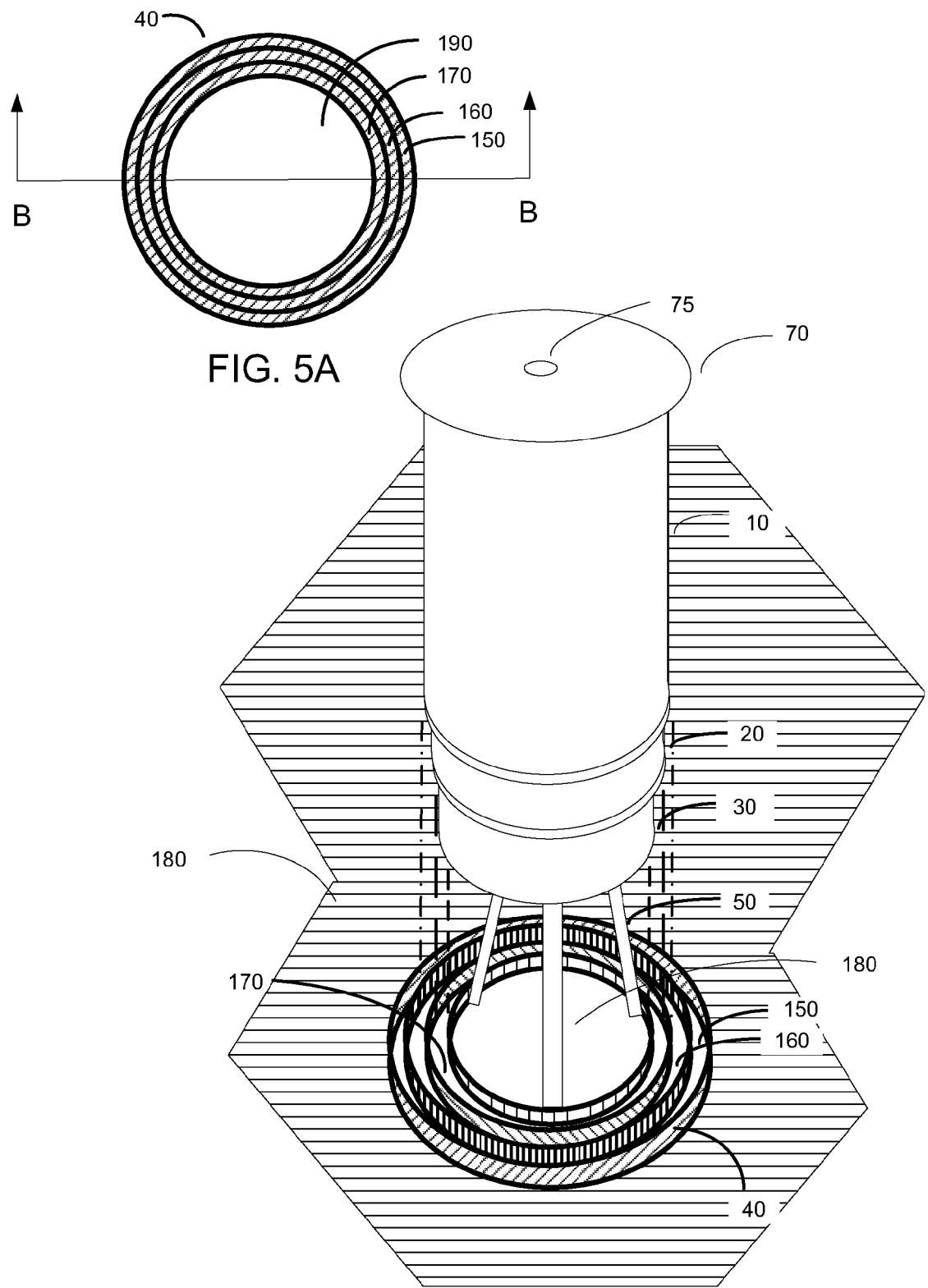
FIG. 5A is a plan view of a multi-channel filter alignment ring for a three-filter assembly.
FIG. 5B is a perspective view showing a filter alignment ring situated to receive a three-element concentric filter assembly.
Figure 5C:
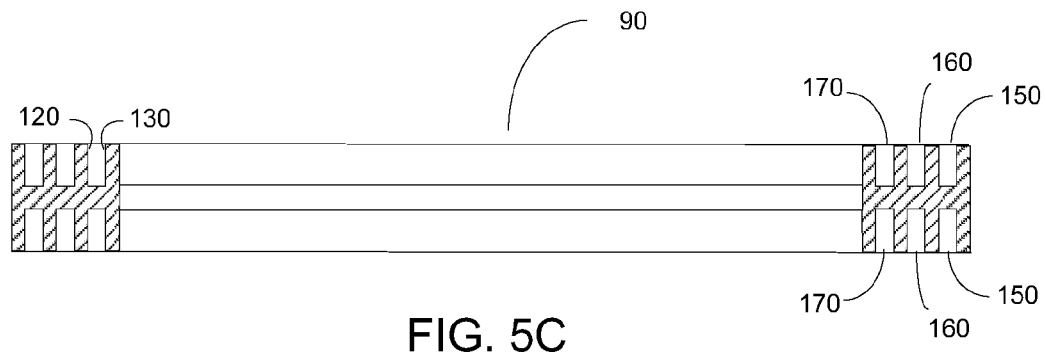
FIGS. 5C and 5D depict different embodiments of a filter alignment ring that can receive a three-concentric filter assembly.
Figure 5D:
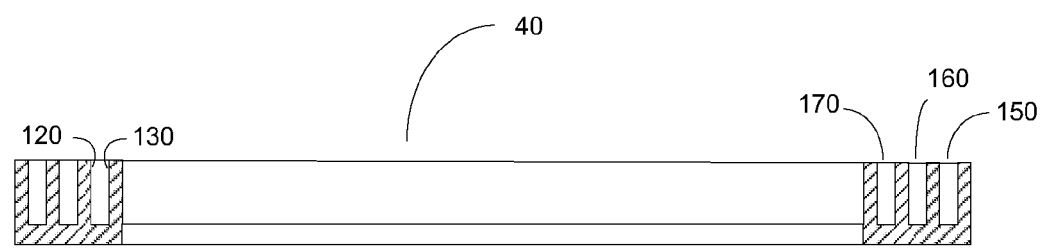

In the embodiment depicted in FIG. 5A, filter alignment ring 40 has a number of concentric troughs or channels, innermost channel 170 being situated to receive high efficiency filter 30, middle channel 160 being situated to receive first upstream filter 20, and outer channel 150 being situated to receive second upstream filter 10. These relationships are depicted in the exploded view of FIG. 5B. In sectional views 5C and 5D, two embodiments of the filter alignment ring are shown. FIG. 5C shows stacked filter alignment ring 90 which has channels 150, 160 and 170 on opposite sides of the ring, and that are adapted to receive the ends of stacked filter elements. Opposing first and second faces 120 and 130 represent the facing walls of each channel. Similar features are found in FIG. 5D, which is a view taken along line B-B in FIG. 5A and depicts a filter alignment ring 40 adapted for being affixed to the surface of manifold 180.

In filter alignment ring 40 or 90, first face 120 is configured to form a sealed interface with the high pressure side of the air filter manifold, while second face 130 has at least one lip at the innermost edge of the filter alignment ring that is concentrically disposed about air passage 190 and is configured to receive an end of at one of the filters in a sealed abutment. Although the figures depict all channels as having sides of the same approximate height, such is not a requirement of the invention, and the sides of channels found in the filter alignment ring may be of varying sizes so long as they serve the purposes of retaining filter elements against distortion caused by air flowing from higher to lower pressure, and of retaining sealing media sufficiently to provide hermitic seals.

Figure 5E:
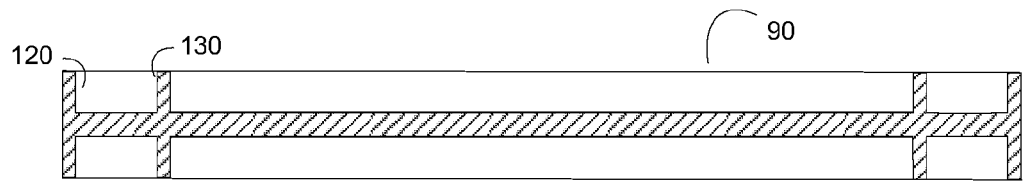
FIGS. 5E and 5F depict embodiments of a filter alignment ring that is suitable for use with two or three-concentric filter assemblies.
Figure 5F:
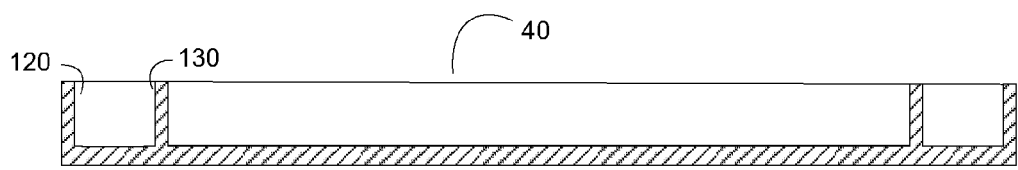

In an embodiment depicted in FIGS. 5E and 5F, the first and second faces form a single substantially circular channel configured to receive the ends of all concentrically assembled filters in a sealed abutment. FIG. 5E shows a stacked filter alignment ring 90 having channels on either side of the ring to receive filter element ends. FIG. 5F depicts a filter alignment ring 40 adapted to be attached to a manifold 180 and to receive the ends of all filter elements within a single channel.

Figure 5G:
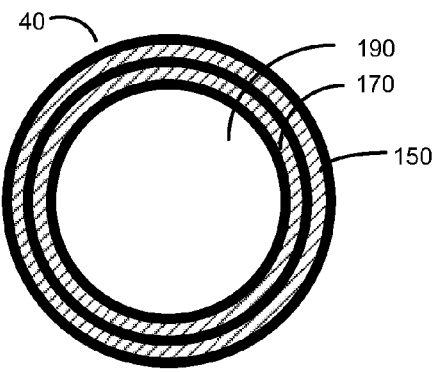
FIG. 5G is the two filter equivalent of the filter alignment ring depicted in FIG. 5A.
Figure 5H:
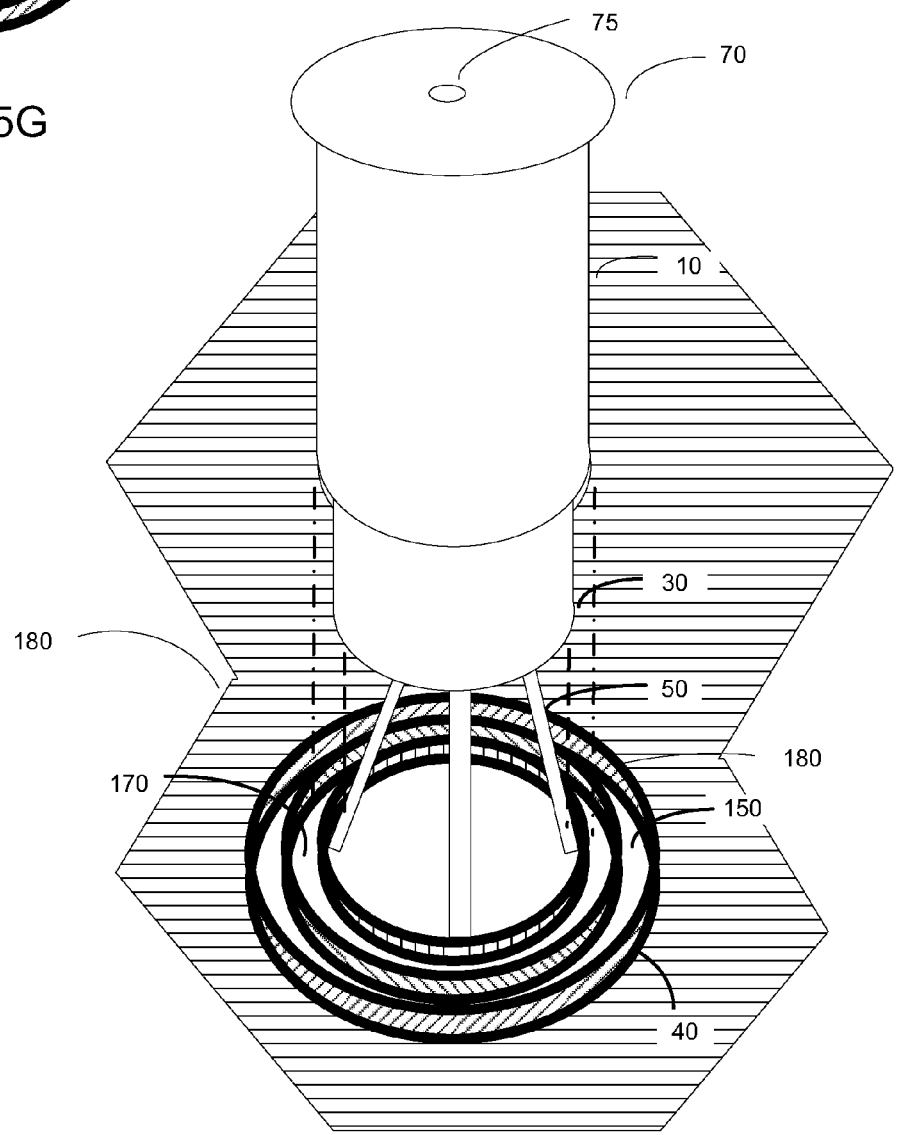
FIG. 5H is a two filter embodiment of a filter alignment ring positioned to receive a two-element filter assembly.

FIG. 5G depicts a two-filter embodiment of filter alignment ring 40 in which two grooves 170 and 150 receive the ends of a two concentric filter assembly. An exploded view of this embodiment is shown in FIG. 5H, in which high efficiency filter 30 will be seated within groove 170 and upstream filter 10 will fit within groove 150.

Typical seals useful in the assemblies and methods of the subject matter disclosed herein include, for example, gaskets, O-rings, any of a plethora of sealants or sealing compounds, washers, or combinations thereof, any of which may be interposed between the ring and the one or more filters or attached to the one or more filters.

The material(s) used to manufacture the filter alignment ring are selected to withstand local environmental conditions and stresses exerted on the combustion turbine and/or provide a useful life expectancy for the ring, while being compatible with the manifold. Alternatively, the material(s) used in filter alignment ring manufacture include, inter alia, iron-based, aluminum-based, titanium-based, and/or composite-based materials, including alloys of such materials or any suitable plastics. When the material is iron-based, the material may be steel, stainless steel, and the like.

In another embodiment, one or more filters may be selected to maximize efficiency or useful life based on local environmental conditions to which the combustion turbine is exposed, for example, dust, particulates, pollutants, and/or salt air. In certain other preferred embodiments, a high efficiency filter comprises a high efficiency particulate air filter (HEPA filter) that satisfies standards of efficiency set by EN1822.

In certain other preferred embodiments, a first upstream filter comprises a filter which provides an intermediate level of filtration capability and typically meets generally recognized standards for filters having an intermediate level of filtration capability. A wide range of intermediate range filter materials are well known to the ordinarily skilled artisan having a filter grade of G2 to H10 or a filter having comparable or equivalent filter characteristics. The diverse range of filters known having a G2 to H10 or comparable filter grade allows the artisan to select a particular filter or filter material to meet specific needs of the turbine, including needs arising as a function of the local environment or required useful filter life, or compatibility with the high efficiency and/or second upstream filter.

In still other preferred embodiments, a second upstream filter may comprise a filter which provides an initial level of filtration or pre-filter capability, and typically meets generally recognized standards for filters having an initial level of filtration or pre-filter capability. A wide range of initial level of filtration or pre-filter capability range filter materials are well known to the ordinarily skilled artisan from a screen to a F9 grade filter or a filter having comparable or equivalent filter characteristics. The wide range of filters known having a coarse screen to an F9 or comparable filter grade allows the artisan to select a particular filter or filter material to meet specific needs of the turbine, including needs arising as a function of the local environment or required useful filter life, or compatibility with the high efficiency and/or first upstream filter.

As previously noted, a preferred embodiment comprising a two-filter assembly may also be used and will enjoy the advantages of lower cost and simpler changeout procedures.

When any variable occurs more than one time in any apparatus, component or in any method, its definition in each occurrence is independent of its definition at every other occurrence. Combinations of variables are permissible only if such combinations result in functioning apparatuses or functional methods.

In other preferred embodiments, the methods for changing out at least one filter further comprise securing a replacement an upstream filter to the support wherein the replacement filter is substantially identical to the filter being changed out, or alternatively the replacement filter being different from the filter being changed out, preferably based on an understanding of local conditions and/or filter performance.

In certain other alternately preferred embodiments, the methods for changing out at least one filter further comprise unsecuring the filter from the support, removing the filter from the filter assembly, securing a replacement filter to the support, where the replacement filter is substantially identical to the filter being changed out, or alternatively the replacement filter being different from the filter being changed out, preferably based on an understanding of local conditions and/or filter performance.

In certain other preferred embodiments, the manifold, support, filter alignment ring, and plurality of filters comprising at least a high efficiency air intake filter, a first upstream filter, and a second upstream filter are in fluid (i.e., gaseous or air) connection.

The disclosures of each patent, patent application and publication cited or described in the application are hereby incorporated herein by reference, in their entirety.

Those skilled in the art will appreciate that numerous changes and modifications can be made to the preferred embodiments of the subject matter disclosed herein and that such changes and modifications can be made without departing from the spirit of the subject matter disclosed herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, types of materials and coatings described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable user of the subject matter disclosed herein to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed:

1. A combustion turbine air intake filter assembly comprising:
   a support;
   a filter alignment ring; and
   a plurality of filters comprising at least a high efficiency air intake filter, and an upstream filter;
   said support having a longitudinal axis and being attached to an air filter manifold, said manifold having a high pressure side and a low pressure side and at least one air passage therethrough, said support having a downstream end and an upstream end and extending essentially perpendicularly from said high pressure side of said air filter manifold, said upstream end of said support being configured to adjustably support one or more of said filters;
   said filter alignment ring having opposing first and second faces and extending concentrically around said at least one air passage through said air filter manifold and having an aperture therethrough, said first face being configured to form a sealed interface with said high pressure side of said air filter manifold, said second face comprising said aperture being aligned with said air passage in said air filter manifold, said ring having a raised wall extending circumferentially around said ring adjacent said aperture, said ring and said raised wall forming a surface for receiving an end of one of said plurality of filters and for preventing said end from substantial lateral movement, the interface between said receiving surface and said end of one of said plurality of filters forming a sealed abutment;

said high efficiency air intake filter being concentrically disposed about a longitudinal axis and having an upstream end and a downstream end;

said longitudinal axis of said high efficiency air intake filter and said longitudinal axis of said support being substantially aligned;

said downstream end of said high efficiency air intake filter being open and forming a hermetically sealed interface with said filter alignment ring;

said upstream end of said high efficiency air filter forming an aperture through which said upstream end of said support may be received and adjustably secured to said high efficiency filter to form a sealed interface between said upstream end of said high efficiency filter said upstream end of said support;

said upstream filter being disposed about a longitudinal axis and having an upstream end and a downstream end, said upstream filter extending concentrically around said high efficiency air filter, said longitudinal axis of said upstream filter and said longitudinal axis of said support being substantially aligned;

said downstream end of said upstream filter being open and forming a hermetically sealed interface with said filter alignment ring;

said upstream end of said upstream filter forming an aperture through which said upstream end of said support may be received, said upstream end of said support being releasably and adjustably secured to said upstream filter such that, when secured, a sealed interface is formed between said upstream end of said upstream filter said upstream end of said support, and when released, said upstream filter may be removed from said assembly during turbine operation.

2. A combustion turbine air filter assembly according to claim 1, wherein said upstream filter further comprises first and second upstream filters and said plurality of filters further comprises said first and second upstream filters and a high efficiency air intake filter, said first and second upstream filters being concentrically assembled, said second upstream filter being disposed about said first upstream filter, and said high efficiency air intake filter being concentrically situated within said first upstream filter.

3. A combustion turbine air filter assembly according to claim 1, wherein said upstream end of said support further comprises a threaded post, and each of at least two of said plurality of said filters is each independently secured to said threaded post by a nut.

4. A combustion turbine air filter assembly according to claim 3, wherein each interface between said each of at least two of said plurality of said filters and said support further comprises a hermetic seal.

5. A combustion turbine air filter assembly according to claim 1, wherein said second face of said filter alignment ring further comprises one or more channels concentrically disposed about said filter alignment ring each said channel being configured to receive a downstream end of at least one of said plurality of filters, said channel further comprising a seal hermetically interposed between said downstream end of at least one of said plurality of filters and said channel.

6. A combustion turbine air filter assembly according to claim 4, further comprising a plurality of air filter assemblies stacked end to end wherein said filter alignment ring comprises a first alignment ring supporting a downstream air filter assembly and a second alignment ring provides a seal between said downstream air filter assembly and an upstream air filter assembly.

7. In a combustion turbine air filter assembly having
a support;
a filter alignment ring; and
a plurality of filters comprising at least a high efficiency air intake filter, a first upstream filter, and a second upstream filter;

said support having a longitudinal axis and being attached to an air filter manifold, said manifold having a high pressure side and a low pressure side and at least one air passage therethrough, said support having a downstream end and an upstream end and extending essentially perpendicularly from said high pressure side of said air filter manifold, said upstream end of said support being configured to adjustably support one or more of said filters;

said filter alignment ring having opposing first and second faces and extending concentrically around said at least one air passage through said air filter manifold and having an aperture therethrough, said first face being configured to form a sealed interface with said high pressure side of said air filter manifold, said second face comprising said aperture being aligned with said air passage in said air filter manifold, said ring having a raised wall extending circumferentially around said ring adjacent said aperture, said ring and said raised wall forming a surface for receiving an end of one of said plurality of filters and for preventing said end from substantial lateral movement, the interface between said receiving surface and said end of one of said plurality of filters forming a sealed abutment;

said high efficiency air intake filter being concentrically disposed about a longitudinal axis and having an upstream end and a downstream end;

said longitudinal axis of said high efficiency air intake filter and said longitudinal axis of said support being substantially aligned;

said downstream end of said high efficiency air intake filter being open and forming a hermetically sealed interface with said filter alignment ring;

said upstream end of said high efficiency air filter forming an aperture through which said upstream end of said support may be received and adjustably secured to said high efficiency filter to form a sealed interface between said upstream end of said high efficiency filter said upstream end of said support;

said first upstream filter being disposed about a longitudinal axis and having an upstream end and a downstream end, said first upstream filter extending concentrically around said high efficiency air filter, said longitudinal axis of said first upstream filter and said longitudinal axis of said support being substantially aligned;

said downstream end of said first upstream filter being open and forming a hermetically sealed interface with said filter alignment ring;

said upstream end of said first upstream filter forming an aperture through which said upstream end of said support may be received, said upstream end of said support being releasably and adjustably secured to said first upstream filter such that, when secured, a sealed interface is formed between said upstream end of said first upstream filter said upstream end of said support, and when released, said first upstream filter may be removed from said assembly during turbine operation; and said second upstream filter being disposed about a longitudinal axis and having an upstream end and a downstream end, said second upstream filter extending concentrically around said first upstream air filter, said longitudinal axis of said second upstream filter and said longitudinal axis of said support being substantially aligned;

said downstream end of said second upstream filter being open and forming a hermetically sealed interface with said filter alignment ring; and said upstream end of said second upstream filter forming an aperture through which said upstream end of said support may be received, said upstream end of said support being releasably and adjustably secured to said second upstream filter such that, when secured, a sealed interface is formed between said upstream end of said second upstream filter said upstream end of said support, and when released, said second upstream filter may be removed from said assembly during turbine operation;

a method of removing an air filter from said assembly while said turbine is in operation comprising the steps of:

unsecuring said second upstream filter from said support; and removing said second upstream filter from the filter assembly.

8. A method according to claim 7, further comprising the steps of: obtaining a replacement filter for said second upstream filter; and securing said replacement second upstream filter to said support.

9. A method according to claim 8, wherein the replacement filter is substantially identical to the second upstream filter being changed out.

10. A method according to claim 8, wherein the replacement filter is a different type of filter than the second upstream filter being changed out.

11. A method according to claim 7, further comprising:
unsecuring said first upstream filter from said support; and
removing said first upstream filter from the filter assembly.

12. A method according to claim 11, further comprising obtaining a replacement filter for said first upstream filter; and securing said replacement first upstream filter to the support.

13. A method according to claim 12, wherein the replacement first upstream filter is substantially identical to the first upstream filter being changed out.

14. A method according to claim 12, wherein the replacement first upstream filter is a different type of filter than the first upstream filter being changed out.

15. A method according to claim 12, further comprising obtaining a replacement filter for said second upstream filter; and securing said replacement second upstream filter to the support to replace the second upstream filter after the first upstream filter has been replaced.

16. A method according to claim 15, wherein the replacement second upstream filter is substantially identical to the second upstream filter being changed out.

17. A method according to claim 15, wherein the replacement second upstream filter is a different type of filter than the second upstream filter being changed out.

18. In a combustion turbine air filter assembly having
a support;
a filter alignment ring;
a plurality of filters comprising at least a high efficiency air intake filter;
a first upstream filter;
and a second upstream filter;

said support having a longitudinal axis and being attached to an air filter manifold, said manifold having a high pressure side and a low pressure side and at least one air passage therethrough, said support having a downstream end and an upstream end and extending essentially perpendicularly from said high pressure side of said air filter manifold, said upstream end of said support being configured to adjustably support one or more of said filters;

said filter alignment ring having opposing first and second faces and extending concentrically around said at least one air passage through said air filter manifold and having an aperture therethrough, said first face being configured to form a sealed interface with said high pressure side of said air filter manifold, said second face comprising said aperture being aligned with said air passage in said air filter manifold, said ring having a raised wall extending circumferentially around said ring adjacent said aperture, said ring and said raised wall forming a surface for receiving an end of one of said plurality of filters and for preventing said end from substantial lateral movement, the interface between said receiving surface and said end of one of said plurality of filters forming a sealed abutment;

said high efficiency air intake filter being concentrically disposed about a longitudinal axis and having an upstream end and a downstream end;

said longitudinal axis of said high efficiency air intake filter and said longitudinal axis of said support being substantially aligned;

said downstream end of said high efficiency air intake filter being open and forming a hermetically sealed interface with said filter alignment ring;

said upstream end of said high efficiency air filter forming an aperture through which said upstream end of said support may be received and adjustably secured to said high efficiency filter to form a sealed interface between said upstream end of said high efficiency filter said upstream end of said support;

said first upstream filter being disposed about a longitudinal axis and having an upstream end and a downstream end, said first upstream filter extending concentrically around said high efficiency air filter, said longitudinal axis of said first upstream filter and said longitudinal axis of said support being substantially aligned; and said downstream end of said first upstream filter being open and forming a hermetically sealed interface with said filter alignment ring;

said upstream end of said first upstream filter forming an aperture through which said upstream end of said support may be received, said upstream end of said support being releasably and adjustably secured to said first upstream filter such that, when secured, a sealed interface is formed between said upstream end of said first upstream filter said upstream end of said support, and when released, said first upstream filter may be removed from said assembly during turbine operation;

said second upstream filter being disposed about a longitudinal axis and having an upstream end and a downstream end, said second upstream filter extending concentrically around said first upstream air filter, said longitudinal axis of said second upstream filter and said longitudinal axis of said support being substantially aligned;

said downstream end of said second upstream filter being open and forming a hermetically sealed interface with said filter alignment ring; and said upstream end of said second upstream filter forming an aperture through which said upstream end of said support may be received, said upstream end of said support being releasably and adjustably secured to said second upstream filter such that, when secured, a sealed interface is formed between said upstream end of said second upstream filter said upstream end of said support, and when released, said second upstream filter may be removed from said assembly during turbine operation;

a method of removing an air filter from said assembly while said turbine is in operation comprising the steps of:

selecting a high efficiency filter, a first upstream filter, and a second upstream filter;

sealing said one or more filters onto said second face of filter alignment ring around said raised wall of said filter alignment ring; and securing each of said one or more filters to said support.

19. A method for installing a combustion turbine air filter assembly according to claim 18, wherein said step of securing each said one or more filters to said support further comprises securing an end cap to an upstream threaded end of said support with a nut.

20. A combustion turbine air intake filter assembly as claimed in claim 1, wherein said filter alignment ring further comprises a plurality of discrete channels disposed concentrically around said raised wall whereby each filter contacting said filter alignment ring fits within a single channel.

21. A combustion turbine air intake filter assembly as claimed in claim 1, wherein said filter alignment ring further comprises a channel and said raised wall comprises the inner wall of said channel whereby each filter end that contacts said filter alignment ring fits within said channel.

22. A combustion turbine air intake filter assembly as claimed in claim 1, wherein said filter alignment ring further comprises a plurality of channels disposed circumferentially around said raised wall, and said raised wall comprises the inner wall of the innermost channel, wherein each channel receives a single filter end.

* * * * *